P. Crosby.
Hanging Saws.
No. 3,454 Reissued May 25, 1869.
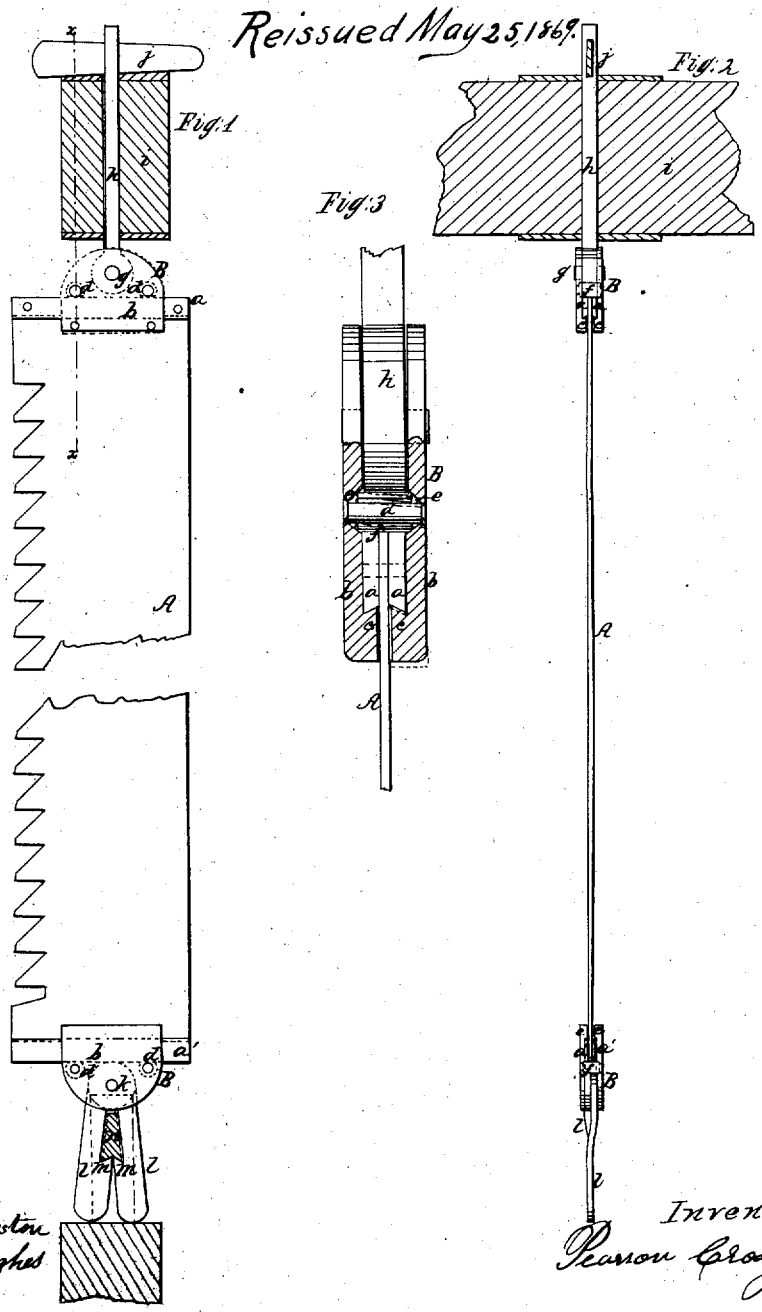
Witnesses
M. M. Livingston
C. M. Hughes
Inventor
Pearson Crosby

United States Patent Office.

THOMAS BAKEWELL AND JOHN LIPPINCOTT, OF PITTSBURG, PENNSYLVANIA, ASSIGNEES, BY MESNE ASSIGNMENTS, OF PEARSON CROSBY.

*Letters Patent No.* 25,632, *dated October* 4, 1859; *reissue No.* 3,454, *dated May* 25, 1869.

IMPROVEMENT IN HANGING RECIPROCATING SAWS.

The Schedule referred to in these Letters Patent and making part of the same.

*To all whom it may concern:*

Be it known that PEARSON CROSBY, of the city, county, and State of New York, has invented a new and useful Improvement in Hanging Reciprocating Saws; and we do hereby declare that the following is a full, clear, and exact description thereof, reference being had to the accompanying drawing, forming part of this specification, in which—

Figure 1 is a side view of a reciprocating saw, showing PEARSON CROSBY'S improved mode of hanging.

Figure 2 is a front view of the same.

Figure 3 is an enlarged front sectional view of the buckle and end of the saw, through the line *x–x*, fig. 1.

The same letters refer to similar parts in the several figures.

The object of this invention is to obviate the difficulties experienced in hanging reciprocating saws, especially when hung in gangs, so as to have them evenly strained, that is, subjected to an equal tension throughout the whole width of the saw, or nearly so, and at the same time admit of the saw being adjusted forward, from time to time, as it is worn or reduced in width by sharpening or gumming.

To enable others skilled in the art to use this invention, we will proceed to describe it by reference to the drawings.

A represents a long saw of the usual reciprocating kind.

At each end of the saw, and on both sides, are metallic strips *a a′*, extending across the saw its whole width or nearly so; the lower edges of the upper strips *a*, and the upper edges of the lower strips *a′*, being bevelled or inclined, so as to form a dovetail, as shown fig. 3, by which the buckles used to hang the saw, having correspondingly bevelled lips *c c*, may the more easily engage and securely hang the saw.

Saws are frequently made very thin, and if the stirrup, or other device by which the saw is hung, bears against these strips *a a′* at one or two points only, the strain of the saw is uneven, and it will "buckle" at those parts where the strain is slightest, and the ends of the saw will be apt to pull off.

Another difficulty arises in giving the proper "rake" or forward set to one end of the saw, where the stirrup is rigidly attached, either to the saw itself, or to the buckle or device intermediate between the saw and the stirrup, that the strain is uneven, and the strips are apt to pull off the end of the saw.

It also sometimes happens that the strips *a a′* are not of exactly equal depth, or are not placed with their bevelled edges on exactly the same plane, in which case the lips of the buckle would not bear equally on both sides of the saw.

The buckles B B′, used for holding the two ends of the saw, and attaching thereto the stirrups of the saw-gate, are composed of two side pieces, or plates *b b*, made of wrought-iron, malleable cast-iron, or other suitable material.

These side pieces *b b* are better made of two separate plates, although they might be made of one piece, and bent over.

The two side pieces *b b* are counterparts of each other, having at one end straight lips *c c*, which project so as to leave a space between them equal only to the thickness of the saw to be held between them.

The lips *c c* are dovetailed or bevelled, (see fig. 3,) so as to correspond exactly with the bevelled edges of the strips *a a′*, attached to the saw A.

These plates must be held together so firmly as to hold the saw, and yet not bind it too closely. This is effected, as also a slight vertical adjustment of one side piece relatively to the other, by means of the rivets *d*, the ends of which are fitted into holes *e*, in the plates *b b*, which holes are countersunk on the inner side, and slightly also on the outer side of the plates, so as to allow a head to be formed on the rivets by upsetting, as shown in fig. 3.

Around each rivet *d* is placed a case, or tube *f*, which serves as bearings, to prevent the lips *c c*, of the plates *b b*, from binding too hard on the sides of the saw.

Rivets, with shoulders below the ends which are to be upset, are an equivalent device for the rivets and tubes, for the purpose just named.

Near the upper edge of the upper buckle B is a pin, *g*, which may have its ends countersunk in corresponding holes in the side pieces *b b*, precisely like the holes *e* for the rivets *d*. The pin *g* fits loosely in its bearings, so that the buckle B may turn thereon, in order to give proper "rake" to the saw.

The iron stirrup *h* is pivoted to the buckle by the pin *g*, and, passing up through the top traverse bar *i* of the sash, is secured therein by the wedge-key *j*, by driving which key the saw is strained.

The lower buckle B′ is similarly constructed, and has a pin, *k*, near its lower edge, fitted in countersunk holes, like the pin *g* of the upper buckle B.

By the pin *k*, the lower links, or bars *l*, or other device by which the lower end of the saw is secured to the lower traverse bar *n* of the sash, are pivoted to the lower buckle B′.

It will be seen that the sides of the buckles thus constructed are plane surfaces, and that the buckles may be made so thin as to permit of their being placed closely together, and thus this invention may be used to hang saws in gangs.

When the wedge-shaped key *j* is driven into the stirrup *h*, the saw A will be strained tight between the upper and lower traverse.

In consequence of the buckles B B′ extending across a great portion of the width of the saw, the saw will be more equally strained, from front to back, than when the bearing is only at one or two points, and all "buckling" of the saw is thereby prevented; and as the saw becomes worn by being gummed or sharpened, it may be moved forward in the buckles B B′, which do not bind sufficiently to prevent such adjustment.

Any required rake or inclination may be given to the saw, in consequence of the pivoting of the stirrups *h* and *l* to the buckles B B′, while the stiles that support the gate are retained in a perpendicular position, and this even when the saws are hung in gangs.

By having the pins *g* and *k* and the rivets *d* fitted loosely into holes countersunk on the inner sides of the plates *b b*, as before described, said plates are allowed, under the strain to which they are subjected in driving home the key *j*, to adjust themselves vertically, so as to compensate for any variance in the depth of the strips *a a a′ a′*, so that such lip *c* shall have a perfect bearing on its strip *a* or *a′*.

Having thus described PEARSON CROSBY's improvement in hanging reciprocating saws,

What we claim as his invention, and desire to secure by Letters Patent, is—

1. Hanging reciprocating saws by means of buckles B, having a continuous bearing on a strap or straps attached at or near the end of the saw, in combination with a pin or pivot, by which the buckle is attached to the stirrup, the buckle being left free to adapt itself to the rake or inclination given to the saw, substantially as described, and for the purposes set forth.

2. Pivoting the stirrup of reciprocating saws by a single pin or pivot to a buckle bearing against straps fastened across the ends of the saw, substantially as described.

3. A buckle for hanging reciprocating saws, consisting of side pieces, each with a continuous lip or lips, for engaging the straps on the ends of the saw, and pivoted by a pin, *q* or *k*, at a single point only, to the stirrup by which it is connected with the saw-gate, substantially as shown and described.

In testimony whereof, we, the said THOMAS BAKEWELL and JOHN LIPPINCOTT, have hereunto set our hands.

THOS. BAKEWELL.
JOHN LIPPINCOTT.

Witnesses:
G. H. CHRISTY,
R. F. JONES.